United States Patent
Frank

(10) Patent No.: US 10,239,543 B2
(45) Date of Patent: Mar. 26, 2019

(54) VEHICLE COOLING SYSTEM AND CORRESPONDING OPERATING METHOD

(71) Applicant: Mahle International GmbH, Stuttgart (DE)

(72) Inventor: Stefan Frank, Gerlingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/519,537

(22) PCT Filed: Sep. 10, 2015

(86) PCT No.: PCT/EP2015/070709
§ 371 (c)(1),
(2) Date: Apr. 14, 2017

(87) PCT Pub. No.: WO2016/058759
PCT Pub. Date: Apr. 21, 2016

(65) Prior Publication Data
US 2017/0259835 A1    Sep. 14, 2017

(30) Foreign Application Priority Data

Oct. 17, 2014 (DE) .................. 10 2014 221 143

(51) Int. Cl.
*B60H 1/00* (2006.01)
*B61D 27/00* (2006.01)
(Continued)

(52) U.S. Cl.
CPC ..... *B61D 27/0072* (2013.01); *B60H 1/00371* (2013.01); *B60H 1/00864* (2013.01);
(Continued)

(58) Field of Classification Search
CPC .. B61D 27/0072; B61D 27/0018; B60H 1/00; B60H 1/00978; B60H 1/323; B60H 1/00371; B60H 1/00864; B61C 3/00
(Continued)

(56) References Cited

U.S. PATENT DOCUMENTS 4,996,849 A * 3/1991 Burst ................ B60H 1/00842
165/202
5,285,347 A    2/1994 Fox et al.
(Continued)

FOREIGN PATENT DOCUMENTS

DE    853463 C    10/1952
DE    4223647 A1    1/1994
(Continued)

OTHER PUBLICATIONS

English abstract for DE-19632053.
(Continued)

*Primary Examiner* — Gregory Huson
*Assistant Examiner* — Dana Tighe
(74) *Attorney, Agent, or Firm* — Fishman Stewart PLLC

(57) ABSTRACT

A vehicle cooling system may include a cooling circuit for cooling at least one main component of a vehicle. The cooling circuit may include at least one cooler through which cooling air is flowable and at least two fan chambers adjoined to an outlet side of the at least one cooler. The at least two fan chambers may each include a respective fan arranged therein, a respective main outlet and a respective ancillary outlet. The vehicle cooling system may also include at least one waste air channel that may be connected to the respective ancillary outlets of the at least two fan chambers. The vehicle cooling system may further include at least one control device configured to control a cross-section of each of the respective ancillary outlets and to enable
(Continued)

operation of the vehicle cooling system in a normal operating state and in at least two emergency operating states.

20 Claims, 3 Drawing Sheets

(51) Int. Cl.
  *B60H 1/32* (2006.01)
  *B61C 3/00* (2006.01)
(52) U.S. Cl.
  CPC ......... *B60H 1/00978* (2013.01); *B60H 1/323* (2013.01); *B61C 3/00* (2013.01); *B61D 27/0018* (2013.01)
(58) Field of Classification Search
  USPC .................................. 454/112, 139, 143, 155
  See application file for complete search history.

(56) References Cited

U.S. PATENT DOCUMENTS

| | | | | |
|---|---|---|---|---|
| 5,526,650 | A * | 6/1996 | Iritani | B60H 1/00907 62/205 |
| 6,581,022 | B2 * | 6/2003 | Murakami | B60H 1/00735 62/133 |
| 6,782,944 | B2 * | 8/2004 | Kim | B60H 1/00064 165/202 |
| 7,082,990 | B1 * | 8/2006 | Uemura | B60H 1/00849 165/203 |
| 9,242,528 | B2 * | 1/2016 | Graaf | B60H 1/00328 |
| 2012/0241126 | A1 * | 9/2012 | Kishi | B60H 1/008 165/42 |
| 2014/0080398 | A1 * | 3/2014 | Tabei | B60H 1/00785 454/75 |
| 2015/0283876 | A1 * | 10/2015 | Froehling | B60H 1/00335 165/121 |

FOREIGN PATENT DOCUMENTS

| | | |
|---|---|---|
| DE | 19632053 A1 | 2/1998 |
| DE | 69701265 T2 | 10/2000 |
| DE | 102005045608 A1 | 3/2007 |
| DE | 102010062647 A1 | 6/2012 |

OTHER PUBLICATIONS

English abstract for DE-4223647.
English abstract DE-69701265.
English abatract for DE-102005045608.
English abstract for DE-102010062647.

* cited by examiner

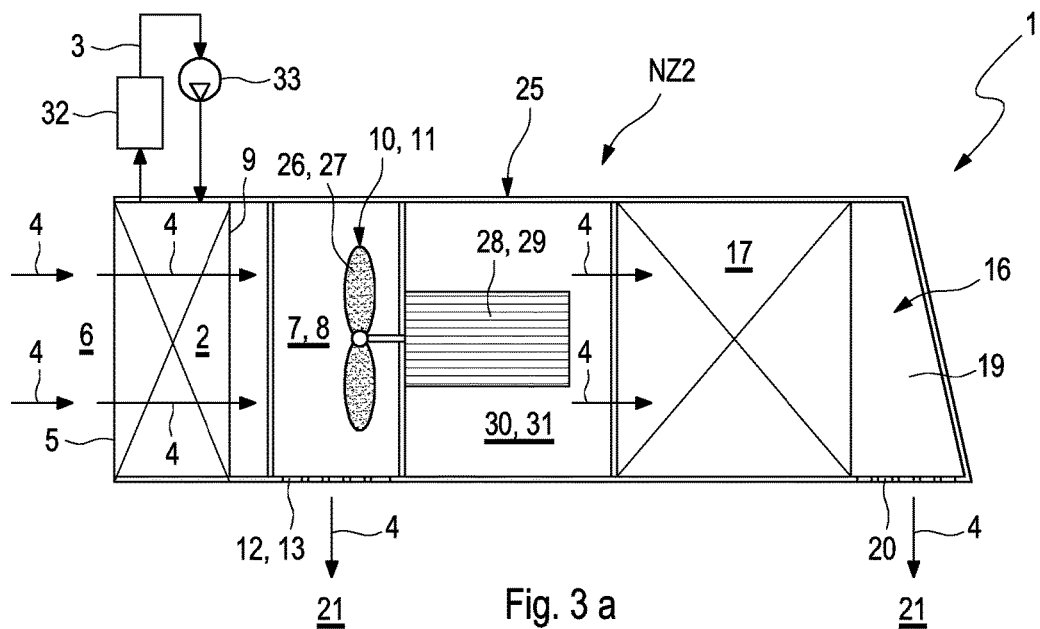
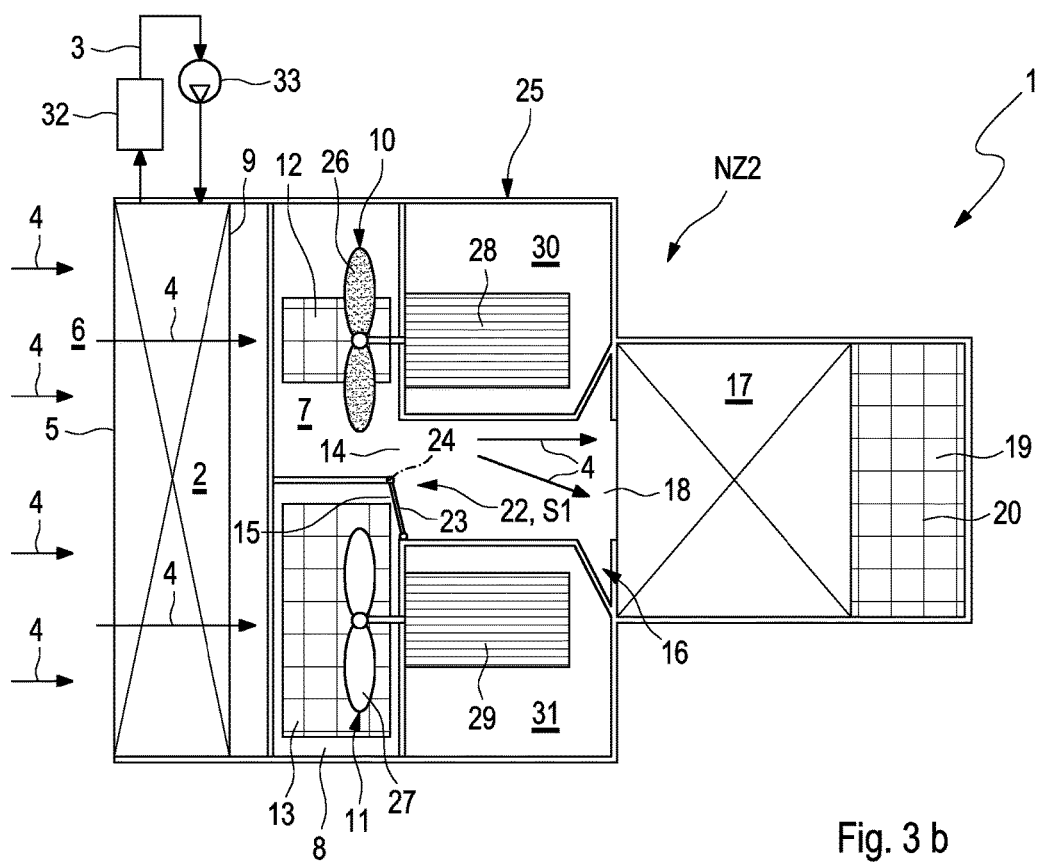

VEHICLE COOLING SYSTEM AND CORRESPONDING OPERATING METHOD

CROSS-REFERENCE TO RELATED APPLICATIONS

This application claims priority to German Patent Application No. DE 10 2014 221 143.3, filed on Oct. 17, 2014, and International Patent Application No. PCT/EP2015/070709, filed on Sep. 10, 2015, both of which are hereby incorporated by reference in their entirety.

TECHNICAL FIELD

The present invention relates to a vehicle cooling system, in particular for rail vehicles, preferably in the form of an underfloor cooling system.

BACKGROUND

Vehicle cooling systems are used in electrically driven rail vehicles, so-called railcars, for cooling main components such as, for example a power electronics and an electric motor. For this purpose the vehicle cooling system can have a cooling circuit in which a liquid coolant circulates and in which the main components are incorporated in a heat-transmitting manner. In addition, a cooling means is incorporated in this circuit, through which cooling air can flow in order to deliver the heat taken up by the coolant to the cooling air. Furthermore, it is usual to use the waste air of the cooling means for cooling ancillary components of the vehicle such as, for example, choke coils, auxiliary transformers, auxiliary motors and switchgear cabinets.

Known from DE 196 32 053 C2 is a vehicle cooling system which has a cooling means of a cooling circuit for cooling a main component of the vehicle, wherein cooling air can flow through the cooling means. The known cooling system additionally has a supply chamber for supplying cooling air to an inlet side of the cooling means. Furthermore, a fan chamber is provided which is connected to an outlet side of the cooling means, in which a fan is arranged and which has a main outlet for cooling air and an ancillary outlet for cooling air. Whereas the main outlet leads to the surroundings of the vehicle, the ancillary outlet is connected to a waste air channel in which an ancillary component of the vehicle is arranged and which has a waste air outlet for cooling air which also leads to the surroundings of the vehicle.

In order in the event of a failure of the fan to be able to nevertheless ensure a sufficient cooling for the respective main component and in particular for the respective ancillary component, it is fundamentally possible to design the vehicle cooling system to be redundant with respect to the fan so that at least two fans are provided. In this case, it can be expedient to arrange the two fans in separate fan chambers which are each connected to the outlet side of the cooling means but have separate main outlets. The two fan chambers are then connected via separate ancillary outlets to the waste air channel. With the aid of a control device, it is then fundamentally possible to open both ancillary outlets for normal operation so that both fans convey cooling air on the one hand to the respective main outlet and on the other hand through the waste air channel to the respective ancillary component and through the waste air outlet. If one of the fans now fails, in an emergency operation with the aid of the control device, the ancillary outlet assigned to the switched-off fan can now be closed so that the remaining switched-on fan conveys cooling air on the one hand through the appurtenant main outlet and on the other hand through the appurtenant ancillary outlet and through the waste air channel to the respective ancillary component and through the waste air outlet. A problem with such a configuration is the fact that the division of the cooling air conveyed by the respective fan to the appurtenant main outlet on the one hand and to the appurtenant opened ancillary outlet on the other hand is only controlled by the different flow resistances. In order to now be able to convey sufficient cooling air through the significantly longer flow path from the respective fan through the appurtenant ancillary outlet, through the waste air channel in which flow takes place through and/or around the respective ancillary component, and through the waste air outlet, the cross-section of the appurtenant main outlet through which flow can take place must have correspondingly small dimension in order to produce a corresponding counter-pressure here. As a result, however the quantity of air flowing through the cooling means is ultimately reduced which reduces the cooling capacity of the cooling means or the appurtenant cooling circuit.

SUMMARY

The present invention is concerned with the problem of provided an improved embodiment for such a vehicle cooling system comprising a plurality of fan chambers and for an appurtenant operating method, which is characterized in particular by an improved cooling capacity.

This problem is solved according to the invention by the subject matters of the independent claims. Advantageous embodiments are the subject matter of the dependent claims.

The invention is based on the general idea in a vehicle cooling system comprising at least two fans downstream of a cooling means, for a normal operating state in which both fans are switched on, of only conveying cooling air through the waste air channel with the air of the one or first fan whilst with the other or second fan cooling air is not conveyed through the waste air channel but substantially only through the appurtenant main outlet. A main outlet assigned to the first fan is hereinafter designated as first main outlet whereas the main outlet assigned to the second fan is hereinafter designated as second main outlet. Since in the normal operating state, the second fan is therefore not required in order to convey cooling air through the waste air channel, the second main outlet can have significantly larger dimensions with regard to the cross-section through which cooling air can flow than the first main outlet assigned to the first fan. Thus, it is possible by means of a comparatively simple measure which is inexpensive to implement, to increase the cooling capacity of the vehicle cooling system at least for the normal operating state which represents the overwhelming majority of all the operating states of the vehicle cooling system. As a result of the larger second main outlet, the entire air flow conveyed by the second fan can be removed at reduced counterpressure so that ultimately more cooling air can be extracted by the cooling means. Accordingly, the cooling capacity of the cooling means and the associated cooling circuit is improved without the electrical power of the second fan needing to be increased for this purpose.

If the first fan now fails, the vehicle cooling system presented here can be operated in a first emergency operating state in which the second fan is now used to convey cooling air through the waste air channel. Since the second main outlet is larger than the first main outlet, the air flow conveyed through the waste air channel in the first emergency operating state is accordingly lower than during the normal operating state if the first fan and the second fan have the same power. The reduced cooling capacity for the respective ancillary component is however acceptable for the first emergency operating state since on the one hand only ancillary components are involved and since on the other hand the first emergency operating state only occurs rarely and in addition only comparatively briefly.

If on the other hand the second fan fails, in a second emergency operating state cooling air is only sucked in through the cooling means with the aid of the first fan but is still divided between the first main outlet and the waste air channel as in the normal operating state. Thus, substantially the same cooling capacity is available for the respective ancillary component.

The solution according to the invention is of particular importance since the performance of the vehicle cooling system can be improved merely by a changed control of the air flows and by an enlarged second main outlet. In particular, it is not necessary to change the cooling means and/or the fan for this increase in capacity.

According to an advantageous embodiment, the control device can comprise at least one adjustable actuator for controlling the ancillary outlets which is adjustable in a pressure-controlled manner and in addition passively depending on the pressure difference between the waste air channel and the fan chambers. In other words, no separate actuating drive is required for adjustment of the actuator. On the contrary, the adjustment of the actuator is made by the pressure differences acting thereon. For example, for the normal operating state as a result of the enlarged second main outlet, the pressure in the second fan chamber can be lowered so far that the actuator automatically adopts a position in which it opens the first ancillary outlet and closes the second ancillary outlet. The actuator automatically adopts this same position when the second fan fails in the second emergency operating state so that in the second fan chamber substantially ambient pressure or even a negative pressure below ambient pressure prevails. If on the other hand, the first fan fails in the first emergency operating state, the pressure in the first fan chamber falls to ambient pressure or below, with the result that the pressure ratios force the actuator to adopt a different position in which it closes the first ancillary outlet and opens the second ancillary outlet. Crucial for the passively adjustable actuator is the dimensioning of the cross-section of the second main outlet through which cooling air can flow in relation to the cross-section of the first main outlet through which cooling air can flow taking into account the flow resistance of the waste air channel. Accordingly, for the passively operating actuator, the flow resistances of the first main outlet, the second main outlet and waste air channel including the flow through or flow around the respective ancillary component as well as the flow resistance of the waste air outlet are matched to one another in such a manner that in the normal operating state a lower pressure prevails in the second fan chamber than in the second fan chamber and in the inlet region of the waste air channel.

According to another embodiment, the cross-section of the second main outlet through which cooling air can flow can be at least twice as large as the cross-section of the first main outlet through which cooling air can flow. With this dimensioning, in particular the previously explained passive control device can be achieved.

In another embodiment, the cross-section of the first main outlet through which cooling air can flow, the cross-section of the first ancillary outlet through which cooling air can flow, and the first fan can be matched to one another so that in the normal operating state and in the second emergency operating state cooling air driven by the first fan also flows through the first main outlet.

Additionally or alternatively it can be provided that the cross-section of the second main outlet through which cooling air can flow, the cross-section of the second ancillary outlet through which cooling air can flow, and the second fan are matched to one another so that in the first emergency operating state, cooling air driven by the second fan also flows through the second main outlet.

Particularly advantageous is an embodiment in which a housing is provided which contains the cooling means, the fan chambers and at least one inlet section of the waste air channel. By this means a particularly compact design can be achieved which on the one hand enables a pre-assembly of the vehicle cooling system and on the other hand simplifies its integration into a vehicle.

According to an advantageous further development, the respective fan can have a fan wheel arranged in the respective fan chamber and a fan motor arranged in a motor compartment for driving the fan wheel. As a result of this design, the fan motor can be comparatively well protected from impurities which can be entrained in the cooling air flow. Expediently here the respective motor compartment is sealed with respect to the respective fan chamber and with respect to the waste air channel so that the respective motor compartment does not have cooling air flowing through it. Expediently the respective motor compartment is also arranged in the aforesaid housing. Alternatively it can also be provided that to also arrange the respective fan motor in the respective fan chamber. It can further be provided to cool the respective fan motor with the waste air flow regardless of whether it is also arranged in the respective fan chamber or in a separate motor compartment.

If two fan chambers and two motor compartments are provided, the waste air channel can run through between the two motor compartments, resulting in a particularly compact, in particular flat design. Preferably the vehicle cooling system is an underfloor cooling system for a rail vehicle. In the installed state of the vehicle cooling system the main outlets and the respective waste air outlet are then open downwards. If the rail vehicle is standing or travelling correctly on rails, the main outlets and the respective waste air outlet are thus open towards a rail bed.

An operating method according to the invention for a vehicle cooling system with two or more fans is characterized by the previously indicated at least three different operating states, namely by the normal operating state, the first emergency operating state and the second emergency operating state. In the normal operating state both fans are switched on. In the first emergency operating state the first fan has failed or is switched off whilst the second fan is switched on. In the second emergency operating state on the other hand, the first fan is switched on whilst the second fan has failed or is switched off. During the normal operating state in the operating method according to the invention cooling air is only guided with the aid of the first fan to at least one of the ancillary components of the vehicle to be cooled whereas with the aid of the second fan, cooling air is only guided, bypassing the respective ancillary component into the surroundings or through the appurtenant second main outlet, In the first emergency operating state on the other hand, the second fan is used to guide cooling air to the respective ancillary component. In the second emergency operating state the first fan is used to guide cooling air to the respective ancillary component.

Preferably the operating method also operates with a pressure-controlled passive control device in order to control air flows inside the cooling system.

Further important features and advantages of the invention are obtained from the subclaims, from the drawings and from the appurtenant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically,

FIG. 3 shows views a and b as in FIG. 1 but during a second emergency operating state.

DETAILED DESCRIPTION

Figure 1:
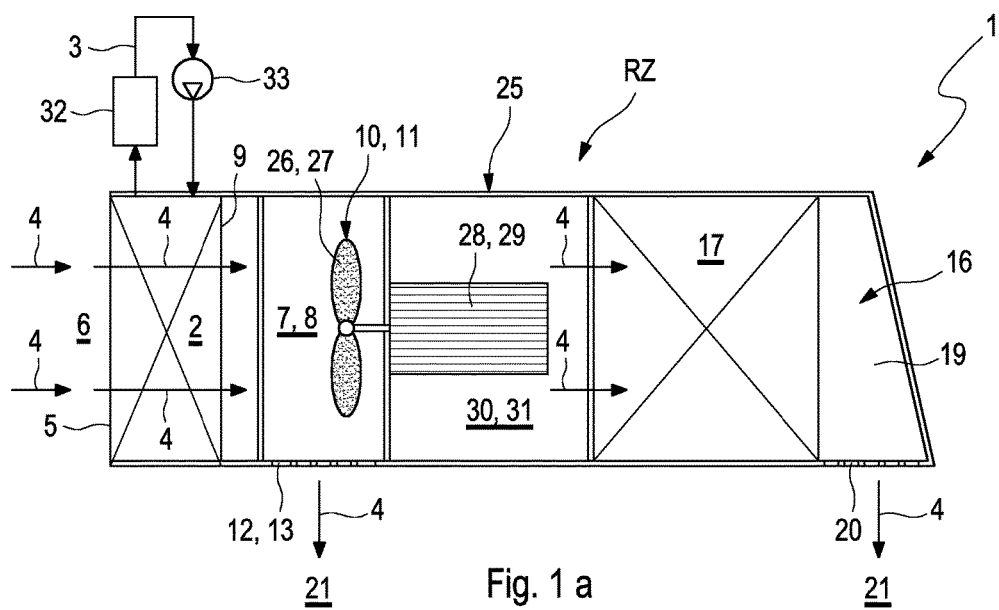
FIG. 1 shows a highly simplified, circuit-diagram-like schematic view of a vehicle cooling system in a side view a and in a top view b, in each case during a normal operating state.
Figure 1:
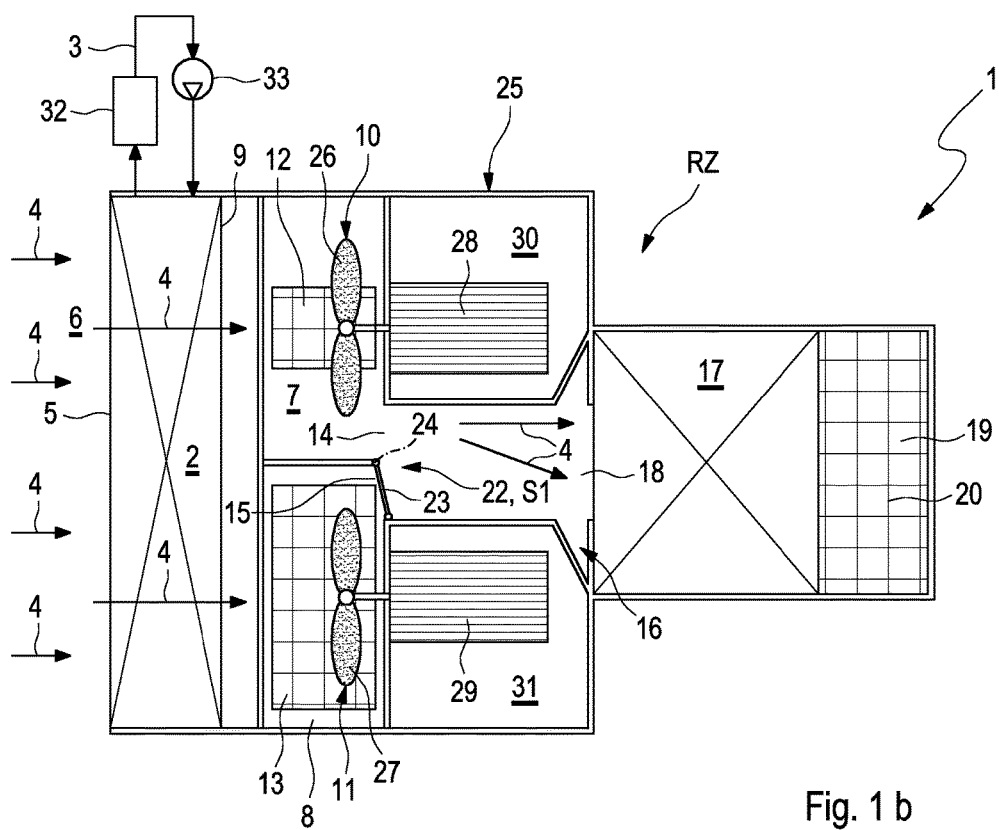
Figure 2:
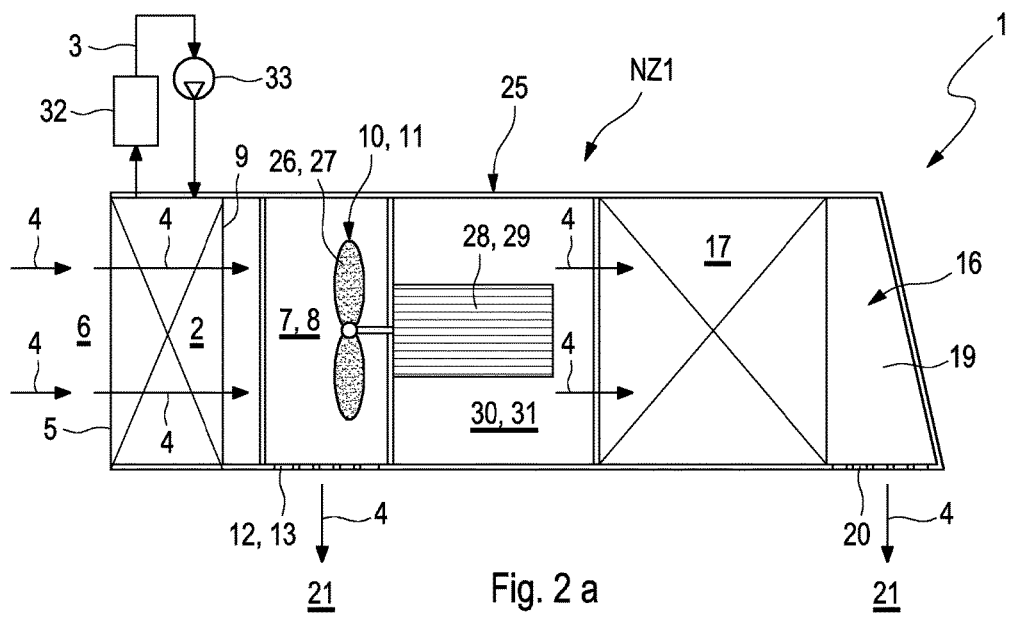
FIG. 2 shows views a and b as in FIG. 1 but during a first emergency operating state.
Figure 2:
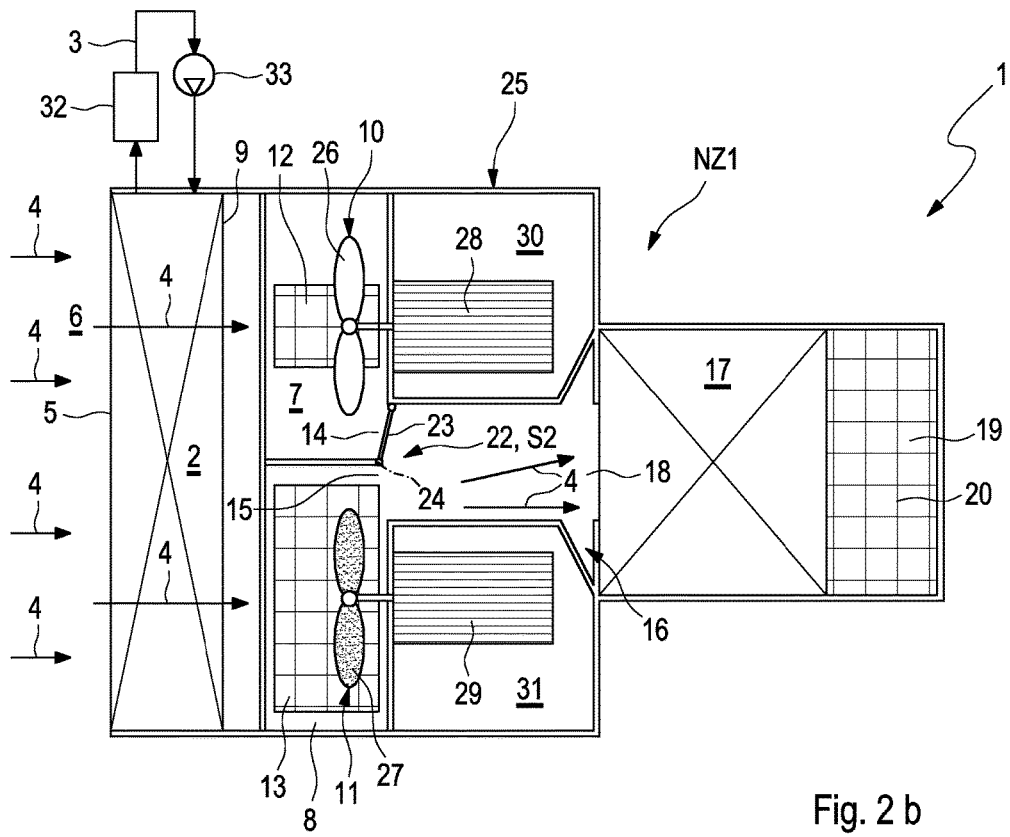

According to FIGS. 1-3 a vehicle cooling system 1 which preferably comprises an underfloor cooling system of a rail vehicle comprises at least one cooling means 2 which is incorporated in a cooling circuit 3 in which a preferably liquid coolant circulates and which serves for cooling at least one main component 32 of the vehicle which is only shown here symbolically. The main component 32 is for example a power electronic unit or an electric drive motor of the vehicle. The cooling circuit 3 contains a pump 33 for driving the coolant. The cooling means 2 can have cooling air 4 flowing through it according to arrows. The supply of cooling air 4 to an inlet side 5 of the cooling means 2 is made through a feed chamber 6 which is accordingly located upstream of the cooling device 2.

The vehicle cooling system 1 additionally comprises a plurality of fan chambers, namely a first fan chamber 7 and a second fan chamber 8. In the examples shown precisely two fan chambers 7, 8 are provided. It is clear that in another embodiment three or more fan chambers 7, 8 can also be provided. The respective fan chamber 7, 8 is in each case fluidically connected to an outlet side 9 of the cooling means 2 so that the cooling air 4 can enter into the fan chambers 7, 8 from the cooling means 2. In each case one fan 10, 11 is located in the respective fan chamber 7, 8. In this case, a first fan 10 is arranged in the first fan chamber 7 whilst a second fan 11 is arranged in the second fan chamber 8. Both fan chambers 7, 8 each have a main outlet 12, 13 for cooling air 4 and in each case one ancillary outlet 14, 15 for cooling air 4. In this case, a first main outlet 12 and a first ancillary outlet 14 are assigned to the first fan chamber 7 whilst a second main outlet 13 and a second ancillary outlet 15 are assigned to the second fan chamber 8.

The vehicle cooling system 1 further comprises a waste air channel 16 in which at least one ancillary component 17 of the vehicle is arranged. The respective ancillary component 17 can, for example, be an electric choke coil or an auxiliary transformer or an electric auxiliary motor or an electric switch cabinet. The arrangement of the respective ancillary component 17 in the waste air channel 16 is made in such a manner that the respective ancillary component 17 can have cooling air 4 flowing around and/or flowing through it so that the respective ancillary component 17 can be cooled with the aid of the cooling air 4. An inlet section 18 of the waste air channel 16 is fluidically connected to the first ancillary outlet 14 and to the second ancillary outlet 15 so that cooling air 4 can flow into the waste air channel 16 from the fan chambers 7, 8. The waste air channel 16 has in an outlet section 19 at least one waste air outlet 20 through which the cooling air 4 can flow out. In the example, the respective ancillary component 17 is arranged between the inlet section 18 and the outlet section 19 in the waste air channel 16.

The main outlets 12, 13 and the waste air outlet 20 are preferably each open to the surroundings 21 of the vehicle cooling system 1 or the vehicle fitted therewith so that cooling air 4 can exit through the respective outlet 12, 13, 20 into the surroundings 21. In the installed state of the vehicle cooling system 1, the main outlets 12, 13 and the waste air outlet 20 are each open downwards to the surroundings 21.

The vehicle cooling system 1 is additionally fitted with a control device 22 which is used for controlling the ancillary outlets 14, 15 with regard to the cross-section through which flow can take place. In the example, the control device 22 is a flap-shaped actuator 23 which is pivotable about a pivot axis 24 between a first switching position S1 shown in FIGS. 1b and 3b and a second switching position S2 shown in FIG. 2b. In the first switching position S1 the actuator 23 opens the first ancillary outlet 14 whilst it blocks the second ancillary outlet 15. In the second switching position S2 the actuator 23 opens the second ancillary outlet 15 whilst it blocks the first ancillary outlet 14. Corresponding to this, two switching states can thus be set with the aid of the control device 22 which correspond with the switching position S1 and S2 of the actuator 23 and accordingly can also be designated with S1 or S2. In the first switching state S1 of the control device 22, the first ancillary outlet 14 is accordingly opened whereas the second ancillary outlet 15 is closed. In the second switching state S2 on the other hand the first ancillary outlet 14 is closed whilst the second ancillary outlet 15 is open.

As can be deduced from FIGS. 1b, 2b and 3b, the second main outlet 13 has larger dimensions than the first main outlet 12. Accordingly the second main outlet 13 has a larger cross-section through which cooling air 4 can flow than the first main outlet 12. In the diagrams show the cross-section of the second main outlet 13 through which flow can take place is at least twice as large as the cross-section of the first main outlet 12 through which flow can take place.

The control device 22 is now configured so that it can implement at least three different operating states for the vehicle cooling system 1, namely a normal operating state RZ shown in FIGS. 1a and 1b, a first emergency operating state NZ1 shown in FIGS. 2a and 2b and a second emergency operating state NZ2 shown in FIGS. 3a and 3b.

In the normal operating state RZ according to FIG. 1b, the first fan 10 and the second fan 11 are switched on so that they each convey fresh air 4. In the normal operating state RZ the control device 22 brings about an opening of the first ancillary outlet 14 and a closing of the second ancillary outlet 15. Accordingly the control device 22 adopts its first switching state S1. Consequently cooling air 4 driven by the first fan 10 can flow from the first fan chamber 7 through the first ancillary outlet 14, through the waste air channel 16 and through the waste air outlet 20. In so doing, flow takes place around or through the respective ancillary component 17 whereby this is accordingly cooled. The cooling air 4 driven by the second fan 11 on the other hand flows, bypassing the waste air channel 16, from the second fan chamber 8 through the second main outlet 13. Since the comparatively large second main outlet 13 only has a relatively small flow resistance, a comparatively large cooling air flow can be conveyed with the aid of the second fan 11 which brings about an efficient cooling of the cooling means 2 and therefore of the coolant circulating in the cooling circuit 3.

In the first emergency operating state NZ1 according to FIG. 2b, the first fan 10 is switched off whereas the second fan 11 is switched on. In the first emergency operating state NZ1 the control device 22 brings about a closing of the first ancillary outlet 14 and an opening of the second ancillary outlet 15. Accordingly the control device 22 adopts its second switching state S2 or the actuator 23 is adjusted into the second switching position S2. Consequently, the cooling air 4 driven by the second fan 11 flows from the second fan chamber 8 through the second ancillary outlet 15, through the waste air channel 16 and through the respective waste air outlet 20. In so doing, flow takes place through or around the respective ancillary component 17 arranged in the waste air channel 16. Since the second main outlet 13 is comparatively large and accordingly has a comparatively low flow resistance, in this first emergency operating state NZ1 the flow of cooling air 4 through the waste air channel 16 is significantly reduced compared with the normal operating state RZ. However, this can be accepted for the comparatively short-term emergency operation.

In the second emergency operating state according to FIG. 3b, the first fan 10 is switched on whilst the second fan 11 is switched off. In the second emergency operating state NZ2 the control device 22 again adopts its first switching state S1. Accordingly the actuator 23 is again adjusted into its first switching position S1. Consequently the ancillary outlet 14 is again opened whilst the second ancillary outlet 15 is closed again. The first fan 10 now drives cooling air 4 again so that this flows from the first fan chamber 7 through the first ancillary outlet 14, through the waste air channel 16 and through the waste air outlet 20. In this case, a cooling of the respective ancillary component 17 takes place as it were as in the normal operating state RZ.

Expediently the control device 22 operates free from external energy, namely pressure-controlled. To this end, the actuator 23 is passively adjustable, namely depending on the pressure differences acting thereon. In the normal operating state RZ according to FIG. 1b and in the second emergency operating state NZ2 according to FIG. 3b, the pressure in the first fan chamber 7 and in the inlet section 18 of the waste air channel 16 is higher than in the second fan chamber 8 with the result that the actuator 22 automatically adopts the first switching position S1 for closing the second ancillary outlet 15 and for opening the first ancillary outlet 14. In the first emergency operating state NZ1 according to FIG. 2b on the other hand, the pressure in the second fan chamber 8 and in the inlet section 18 of the waste air channel 16 is higher than in the first fan chamber 7, with the result that the actuator 23 is automatically adjusted into its second switching position S2 in which it closes the first ancillary outlet 14 and releases the second ancillary outlet 15.

The first main outlet 12 and the second main outlet 13 are uncontrolled, i.e. permanently open. However they are matched with regard to the cross-section through which flow can take place to the capacity of the respective fan 10, 11 and to the flow resistance of the waste air channel 16 so that in each case a flow of cooling air takes place through the respective main outlet 12, 13 when the appurtenant fan 10, 11 is switched on.

As can be deduced from FIGS. 1 to 3, the vehicle cooling system 1 also has a housing 25 which contains the cooling means 2, the fan chambers 7, 8 and at least one inlet section 18 of the waste air channel 16. In this case, the fan chambers 7, 8 are arranged horizontally adjacent to one another so that in the normal operating state RZ parallel flow takes place through these. The fans 10, 11 each comprise a fan wheel, namely a first fan wheel 26 and a second fan wheel 27 as well as a fan motor, namely a first fan motor 28 and a second fan motor 29. The first fan motor 28 is in this case arranged in a first motor compartment 30 and is used to drive the first fan wheel 26. The second fan motor 29 is used to drive the second fan wheel 27 and is arranged in a second motor compartment 31. The motor compartments 30, 31 are fluidically separated from the fan chambers 7, 8 and from the waste air channel 16 so that no cooling air 4 flows through them. Furthermore the motor compartments 30, 31 are preferably also accommodated in the housing 25.

A method for operating the vehicle cooling system 1 can be summarized as follows:

In the normal operating state RZ according to FIGS. 1a and 1b, the first fan 10 and the second fan 11 are switched on so that only cooling air 4 driven by the first fan 10 is guided from the cooling means 2 to the respective ancillary component 17 and then through the waste air outlet 4. Cooling air 4 driven by the second fan 11 is in this case not guided to the respective ancillary component 17 but only through the second main outlet 13.

According to FIGS. 2a and 2b, in the first emergency operating state NZ1 the first fan 10 is switched off and the second fan 11 is switched on where cooling air 4 driven by the second fan 11 is guided firstly from the cooling means 2 to the respective ancillary component 17 and then through the waste air outlet 20.

According to FIGS. 3a and 3b, in the second emergency operating state NZ2 the first fan 10 is switched on and the second fan 11 is switched off whereby only cooling air 4 driven by the first fan 10 is guided from the cooling means 2 to the respective ancillary component 17 and then through the waste air outlet 20.

Since in the vehicle cooling system 1 presented here, the control device 22 operates in a pressure-controlled manner, the switching on or switching off of the respective fan 10, 11 brings about the pressure difference required at the actuator 23 for setting the respectively desired switching position S1 or S2 of the actuator 23 or the respective switching state S1 or S2 of the control device 22. Thus, in particular an electric-motor drive or the like for the actuator 23 can be dispensed with.

The invention claimed is:

1. A vehicle cooling system, comprising:
   at least one cooler of a cooling circuit for cooling at least one main component of a vehicle, cooling air being flowable through the at least one cooler;
   at least two fan chambers adjoined to an outlet side of the at least one cooler, each of the at least two fan chambers including a fan arranged therein, a main outlet through which the cooling air is flowable and an ancillary outlet having a cross-section through which the cooling air is flowable;
   at least one waste air channel for supplying the cooling air to at least one ancillary component of the vehicle, the at least one waste air channel connected to the ancillary outlets of each of the at least two fan chambers; and at least one control device for controlling the cross-section of each of the respective ancillary outlets, the control device configured to enable operation of the vehicle cooling system in a normal operating state and in at least two emergency operating states, the at least two emergency operating states including a first emergency operating state and a second emergency operating state;

wherein a first fan chamber of the at least two fan chambers includes a first fan, a first main outlet and a first ancillary outlet, and a second fan chamber of the at least two fan chambers includes a second fan, a second main outlet and a second ancillary outlet, the second main outlet having a cross-section through which the cooling air is flowable that is larger than a cross-section of the first main outlet, through which the cooling air is flowable;

wherein the control device in the normal operating state, in which the first fan and the second fan are switched on, opens the first ancillary outlet and closes the second ancillary outlet such that (i) the cooling air driven by the first fan flows from the first fan chamber through the first ancillary outlet and through the waste air channel and (ii) the cooling air driven by the second fan bypasses the waste air channel and flows from the second fan chamber through the second main outlet;

wherein the control device in the first emergency operating state, in which the first fan is switched off and the second fan is switched on, closes the first ancillary outlet and opens the second ancillary outlet such that the cooling air driven by the second fan flows from the second fan chamber through the second ancillary outlet and through the waste air channel; and wherein the control device in the second emergency operating state, in which the first fan is switched on and the second fan is switched off, opens the first ancillary outlet and closes the second ancillary outlet such that the cooling air driven by the first fan flows from the first fan chamber through the first ancillary outlet and through the waste air channel.

2. The vehicle cooling system according to claim 1, wherein the control device includes at least one adjustable actuator configured to control the respective ancillary outlets, the at least one adjustable actuator configured to be adjustable in a pressure-controlled manner passively depending on a pressure difference between the waste air channel and the at least two fan chambers.

3. The vehicle cooling system according to claim 2, wherein the cross-section of the second main outlet is at least twice as large as the cross-section of the first main outlet.

4. The vehicle cooling system according to claim 2, wherein the cross-section of the first main outlet, a cross-section of the first ancillary outlet through which the cooling air is flowable, and the first fan correspond to one another such that in the normal operating state and in the second emergency operating state the cooling air driven by the first fan also flows through the first main outlet.

5. The vehicle cooling system according to claim 2, wherein the cross-section of the second main outlet, a cross-section of the second ancillary outlet through which the cooling air is flowable, and the second fan correspond to one another such that in the first emergency operating state the cooling air driven by the second fan also flows through the second main outlet.

6. The vehicle cooling system according to claim 2, further comprising a housing configured to contain the at least one cooler, the at least two fan chambers and at least one section of the waste air channel.

7. The vehicle cooling system according to claim 6, wherein each respective fan includes a fan wheel arranged in the respective fan chamber and a fan motor configured to drive the fan wheel, the fan motor arranged in a respective motor compartment, the respective motor compartment arranged within the housing and configured such that the cooling air is not flowable through the respective motor compartment.

8. The vehicle cooling system according to claim 2, wherein the vehicle cooling system is an underfloor cooling system for a rail vehicle, and wherein the respective main outlets and the waste air outlet open downwards in an installed state.

9. The vehicle cooling system according to claim 1, wherein the cross-section of the second main outlet is at least twice as large as the cross-section of the first main outlet.

10. The vehicle cooling system according to claim 1, wherein the cross-section of the first main outlet, a cross-section of the first ancillary outlet through which the cooling air is flowable, and the first fan correspond to one another such that in the normal operating state and in the second emergency operating state the cooling air driven by the first fan also flows through the first main outlet.

11. The vehicle cooling system according to claim 1, wherein the cross-section of the second main outlet, a cross-section of the second ancillary outlet through which the cooling air is flowable, and the second fan correspond to one another such that in the first emergency operating state the cooling air driven by the second fan also flows through the second main outlet.

12. The vehicle cooling system according to claim 1, further comprising a housing configured to contain the at least one cooler, the at least two fan chambers and at least one section of the waste air channel.

13. The vehicle cooling system according to claim 12, wherein each respective fan includes a fan wheel arranged in the respective fan chamber and a fan motor configured to drive the fan wheel, the fan motor arranged in a respective motor compartment, the respective motor compartment arranged within the housing and configured such that the cooling air is not flowable through the respective motor compartment.

14. The vehicle cooling system according to claim 1, wherein the vehicle cooling system is an underfloor cooling system for a rail vehicle, and wherein the respective main outlets and the waste air outlet open downwards in an installed state.

15. A method for operating a vehicle cooling system in a vehicle, the vehicle cooling system having at least one cooler, at least one fan arranged downstream of the at least one cooler, the at least one fan includes a first fan and a second fan, and at least one ancillary component of the vehicle arranged downstream of the at least two fans, the at least one ancillary component configured to receive cooling air from at least one of the first fan and the second fan, the method comprising:

driving the cooling air via the first fan and the second fan in a normal operating state in which the first fan and the second fan are switched on, a first ancillary outlet is open and a second ancillary outlet is closed, the first fan driving the cooling air from the at least one cooler to a first main outlet (12) and through the open first ancillary outlet to the at least one ancillary component, the second fan driving the cooling air from the at least one cooler through a second main outlet;

driving the cooling air via the second fan in a first emergency state in which the first fan is switched off, the second fan is switched on, the first ancillary outlet is closed and the second ancillary outlet is opened, the second fan driving the cooling air from the at least one cooler to the second main outlet and through the open second ancillary outlet to the at least one ancillary component; and driving the cooling air via the first fan in a second emergency operating state in which the first fan is switched on, the second fan is switched off, the first ancillary outlet is open and the second ancillary outlet is closed, the first fan driving the cooling air from the at least one cooler to the first main outlet and through the open first ancillary outlet to the at least one ancillary component.

16. The method according to claim 15, further comprising controlling the cooling air via a control device that is pressure-controlled and operates passively.

17. A vehicle cooling system, comprising:
a cooling circuit for cooling at least one main component of a vehicle, the cooling circuit including at least one cooler through which cooling air is flowable;
at least two fan chambers adjoined to an outlet side of the at least one cooler, each of the at least two fan chambers including a respective fan arranged therein, a respective main outlet through which the cooling air is flowable and a respective ancillary outlet having a cross-section through which the cooling air is flowable;
a first fan chamber of the at least two fan chambers, the first fan chamber including a first fan, a first main outlet and a first ancillary outlet;
a second fan chamber of the at least two fan chambers, the second fan chamber including a second fan, a second main outlet and a second ancillary outlet, the second main outlet having a cross-section through which the cooling air is flowable that is larger than a cross-section of the first main outlet through which the cooling air is flowable;
at least one waste air channel for supplying the cooling air to at least one ancillary component of the vehicle, the at least one waste air channel connected to the respective ancillary outlets of the at least two fan chambers; and
at least one control device configured to control the cross-section of each of the respective ancillary outlets, the control device configured to enable operation of the vehicle cooling system in a normal operating state and in at least two emergency operating states, the at least two emergency operating states including a first emergency operating state and a second emergency operating state;
wherein the cross-section of the first main outlet, a cross-section of the first ancillary outlet through which the cooling air is flowable, and the first fan correspond to one another such that in the normal operating state and in the second emergency operating state the cooling air driven by the first fan also flows through the first main outlet;
wherein the cross-section of the second main outlet, a cross-section of the second ancillary outlet through which the cooling air is flowable, and the second fan correspond to one another such that in the first emergency operating state the cooling air driven by the second fan also flows through the second main outlet;
wherein the control device in the normal operating state, in which the first fan and the second fan are switched on, opens the first ancillary outlet and closes the second ancillary outlet such that (i) the cooling air driven by the first fan flows from the first fan chamber through the first ancillary outlet and through the waste air channel and (ii) the cooling air driven by the second fan bypasses the waste air channel and flows from the second fan chamber through the second main outlet;
wherein the control device in the first emergency operating state, in which the first fan is switched off and the second fan is switched on, closes the first ancillary outlet and opens the second ancillary outlet such that cooling air driven by the second fan flows from the second fan chamber through the second ancillary outlet and through the waste air channel; and
wherein the control device in the second emergency operating state, in which the first fan is switched on and the second fan is switched off, opens the first ancillary outlet and closes the second ancillary outlet such that cooling air driven by the first fan flows from the first fan chamber through the first ancillary outlet and through the waste air channel.

18. The vehicle cooling system according to claim 17, wherein the control device includes at least one adjustable actuator configured to control the respective ancillary outlets, the at least one adjustable actuator configured to be adjustable in a pressure-controlled manner passively depending on a pressure difference between the waste air channel and the at least two fan chambers.

19. The vehicle cooling system according to claim 17, further comprising a housing configured to contain the at least one cooler, the at least two fan chambers and at least one section of the waste air channel.

20. The vehicle cooling system according to claim 19, wherein each respective fan includes a fan wheel arranged in the respective fan chamber and a fan motor configured to drive the fan wheel, the fan motor arranged in a respective motor compartment, the respective motor compartment arranged within the housing and configured such that the cooling air is not flowable through the respective motor compartment.

* * * * *